Nov. 17, 1925.
O. LARSEN
VALVE
Filed Nov. 8, 1922
1,561,867
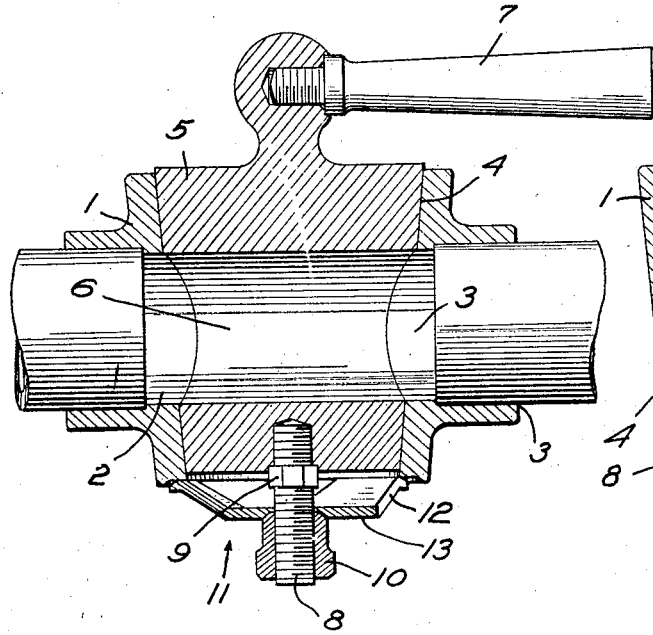
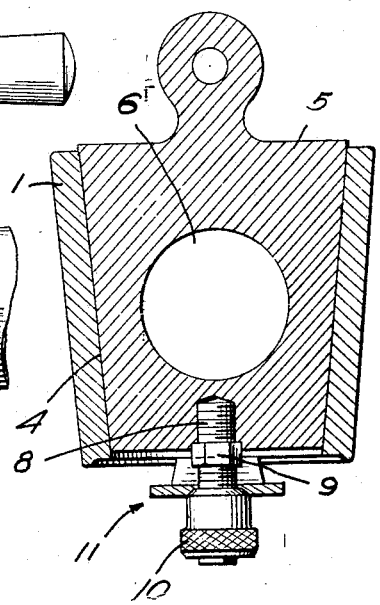
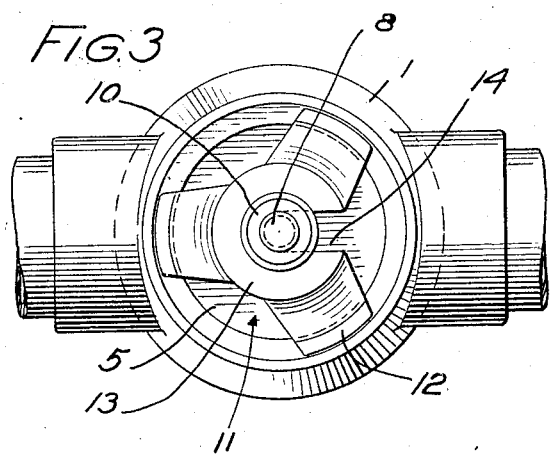
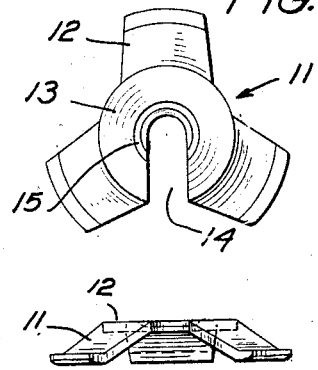
Inventor
Olaf Larsen
by Hewitt S. Dixon
Atty Patented Nov. 17, 1925.

1,561,867

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

VALVE.

Application filed November 8, 1922. Serial No. 599,619.

*To all whom it may concern:*

Be it known that I, OLAF LARSEN, a citizen of the United States, residing at Fort Atkinson, in the county of Jefferson and the State of Wisconsin, have invented certain new and useful Improvements in Valves, of which the following is a specification.

The invention relates to valves of the turning plug type, more particularly to means for removably securing the plug in its seat.

An essential feature of valves employed in conduits containing milk or other edible liquid is the facility with which they may be cleaned and kept in a sanitary condition. It is obviously desirable that there be no inaccessible pockets in their construction, that the parts may be easily and quickly disassembled for sterilization, and that they be easily operable without leakage when in use. It frequently occurs in the ordinary construction of such valves that the plug securing means at the bottom of the valve casing accumulates some escaped liquid, and when not readily accessible for cleansing, or when difficult to remove quickly, the condition is apt to be neglected and become very unsanitary.

It is the object of this invention to provide a sanitary valve in which the plug securing means is constructed to permit thorough cleansing at all times when assembled in the valve; which may be instantly detached when it is desirable to remove the valve plug for a general cleaning; and which assures an easily operable valve, tight against leakage when in use.

Other objects and advantages will be apparent in the following description of a preferred embodiment of my invention, which I have selected for illustration in the accompanying drawings.

Referring to the drawings, Fig. 1 represents a longitudinal sectional view of a valve employing the principles of my invention; Fig. 2 is a cross sectional view of the valve; Fig. 3 is a bottom view; and Figs. 4 and 5 are detail views of one of the plug securing members.

The reference numeral 1 indicates a valve casing having lateral openings 2 and 3 forming inlet and outlet connections for piping containing the liquid to be controlled. A cone shaped valve seat 4 extending through the casing accommodates a similarly tapered turning plug 5 having a transverse passage 6 adapted to register simultaneously with the inlet and outlet openings 2 and 3, or to be turned out of register and close the valve passage, the plug being rotatable by a handle 7.

The open ends of the valve seat 4 fully expose the ends of the turning plug 5, and it will be observed that the device which I have provided for retaining the plug in operative position in its seat does not enclose the end of the plug to which it is attached, but permits free access for the application of a cleansing fluid.

The plug retaining device comprises an axial stem 8, preferably screw threaded into the body of the plug and secured by a lock nut 9, the outer end of the stem supporting a thumb or knurled nut 10 adjustably screw threaded thereon. Confined between the nut 10 and the base of the valve casing 1 is a compression member 11, having resilient radial arms 12 engaging the valve casing adjacent the edge of the valve seat, and having a centrally apertured web portion 13 receiving the stem 8 and abutting the nut 10. The member 11 preferably is dished outwardly to provide a substantial space between it and the plug end, so that there is ample space between and above the radial arms for the free application of a cleansing fluid without disassembling the parts.

The member 11 is also provided with a lateral slot 14 communicating with its central stem receiving aperture, permitting the instant removal or replacement of the member by simply sliding it laterally out of or into operative position between the casing and the nut 10, the stem passing through the slot 14. Having removed the member 11, the other parts of the retaining device readily pass through the valve seat opening upon the withdrawal of the plug, and without further disassembling. An annular depression 15 may be formed in the nut-abutting face of the portion 13 about the margin of the central aperture, so that when in normal position the nut 10 is seated therein, preventing accidental displacement of the member 11.

Tension in the arms 12 is obtained by adjusting the position of the nut 10 against its seat in the portion 13, the arrangement of the resilient arms being such that a firm but yielding pressure is maintained against the nut 10, which acts through the stem 8 to secure the plug 5 in snug but easily operable engagement with its seat, and minimizes the liability of leakage in operation.

It will now be apparent that I have provided a simple, durable, and effective means for securing the turning plug in operative position, which permits its maintenance at all times in sanitary condition, which facilitates disassembling of the valve parts, and which improves the operative efficiency of the valve.

I claim as my invention;

1. The combination of a valve casing having a tapered valve seat opening therethrough, a tapered valve plug operable in said seat, and means for retaining said plug in said seat comprising a stem secured in the smaller end of said plug and extending outwardly of said casing, an adjustable abutment carried on the outer portion of said stem, and a unitary compression member removably confined between said casing and said abutment, said member having spaced radial arms yieldingly abutting said casing and exposing the end of said plug therebetween, said member also having a slot in its center portion adapted to receive said stem and to permit the lateral withdrawal of said member from normal position of confinement, said member being recessed at the inner end of said slot for engagement with said abutment.

2. In a valve having a casing with a tapered valve seat formed therein and a tapered valve plug operable in said seat, the combination of a stem secured in axial position in the smaller end of said plug and extending outwardly of said casing, an adjustable nut threaded upon the outer portion of said stem and having a tapered inner end, and a unitary compression member confined between said casing and said nut comprising a recessed center portion normally abutting said tapered nut and having a slot to receive said stem, said slot extending from the center to the periphery of said portion to permit the lateral withdrawal of said member from normal position, and a plurality of spaced radial arms fixed on said center portion and extending into resiliently tensioned abutment with said casing, said arms being spaced apart to permit the application of cleansing fluid to the plug retaining parts.

In witness whereof I have hereunto set my hand.

OLAF LARSEN.